US010728040B1

(12) United States Patent
Seibert et al.

(10) Patent No.: US 10,728,040 B1
(45) Date of Patent: Jul. 28, 2020

(54) CONNECTION-BASED NETWORK BEHAVIORAL ANOMALY DETECTION SYSTEM AND METHOD

(71) Applicants: Tai Seibert, San Diego, CA (US); Haw-minn Lu, San Diego, CA (US)

(72) Inventors: Tai Seibert, San Diego, CA (US); Haw-minn Lu, San Diego, CA (US)

(*) Notice: Subject to any disclaimer, the term of this patent is extended or adjusted under 35 U.S.C. 154(b) by 0 days.

(21) Appl. No.: 16/132,273

(22) Filed: Sep. 14, 2018

Related U.S. Application Data

(63) Continuation-in-part of application No. 14/822,843, filed on Aug. 10, 2015, now Pat. No. 10,103,890.

(60) Provisional application No. 62/035,259, filed on Aug. 8, 2014.

(51) Int. Cl.
*H04L 9/32* (2006.01)

(52) U.S. Cl.
CPC .................. *H04L 9/3247* (2013.01)

(58) Field of Classification Search
CPC . H04L 9/3247; H04L 63/0823; H04L 63/123; H04W 12/06; G06F 21/64
See application file for complete search history.

(56) References Cited

U.S. PATENT DOCUMENTS

2004/0168077 A1* 8/2004 Waxman ............ G06F 21/6227 726/28
2005/0283838 A1* 12/2005 Saito .................. G06F 21/563 726/24
2006/0026685 A1* 2/2006 Saito .................. G06F 21/52 726/23

(Continued)

*Primary Examiner* — Yonas A Bayou
(74) *Attorney, Agent, or Firm* — Insigne LLP; Trevor Q. Coddington

(57) ABSTRACT

Various embodiments of the present disclosure provide a system and method for detecting network connections having a plurality of interconnected network nodes; a connection-based behavioral anomaly detection device ("CBAD") connected to one of the plurality of network nodes such that the CBAD may observe data traffic flowing through at least one node of the plurality of network nodes; an application loaded onto a first node of the plurality of network nodes, the application initializing a connection from the first node to a second node of the plurality of network nodes; and a computer-readable storage device communicatively connected to the CBAD; wherein the application transmits a plurality of data packets from the first node to the second node of the plurality of network nodes; the CBAD observes at least one of the plurality of data packets exchanged between the first node and the second node; the CBAD extrapolates packet information from at least one of the plurality of data packets observed; and the extrapolated packet information is stored on the storage device. The present disclosure also provides a method and system for detecting connections within a network including observing a plurality of data packets transferred from an application loaded onto a first node to a second node of the plurality of interconnected network nodes; extrapolating packet information; and comparing the extrapolated data packets against historical data; wherein the CBAD is connected to at least one of the nodes; and the application initialized a connection with the second node.

23 Claims, 11 Drawing Sheets

(56) References Cited

U.S. PATENT DOCUMENTS

| | | | | |
|---|---|---|---|---|
| 2006/0041863 A1* | 2/2006 | Saito | .................... | G06F 21/566 |
| | | | | 717/124 |
| 2009/0049551 A1* | 2/2009 | Ahn | .................... | G06F 21/562 |
| | | | | 726/23 |
| 2009/0210705 A1* | 8/2009 | Chen | .................... | H04L 9/0891 |
| | | | | 713/158 |
| 2010/0050256 A1* | 2/2010 | Knapp | ................ | H04L 63/1425 |
| | | | | 726/22 |
| 2010/0192222 A1* | 7/2010 | Stokes | ................. | G06F 21/563 |
| | | | | 726/22 |
| 2010/0284282 A1* | 11/2010 | Golic | ................... | H04L 43/022 |
| | | | | 370/242 |
| 2012/0174181 A1* | 7/2012 | Zhang | .................... | G06F 21/10 |
| | | | | 726/1 |
| 2012/0260342 A1* | 10/2012 | Dube | ................... | G06F 21/564 |
| | | | | 726/24 |
| 2013/0321458 A1* | 12/2013 | Miserendino | ....... | H04L 41/0883 |
| | | | | 345/629 |
| 2016/0261482 A1* | 9/2016 | Mixer | .................... | H04L 43/12 |

\* cited by examiner

CONNECTION-BASED NETWORK BEHAVIORAL ANOMALY DETECTION SYSTEM AND METHOD

CROSS-REFERENCE TO RELATED APPLICATION

The present application is a continuation-in-part of, and claims priority to, U.S. Utility patent application Ser. No. 14/822,843 entitled, "MEMBERSHIP QUERY METHOD," filed on Aug. 10, 2015, which claims priority to U.S. Provisional Application No. 62/035,259, filed on Aug. 8, 2014, entitled, "Systems and Methods for Detecting Malicious Cyber Activity Using Novelty Filtration," both of which are fully incorporated herein.

STATEMENT REGARDING FEDERALLY SPONSORED RESEARCH

The application to which this application claims priority contains work that was funded in part by Grant No. N660011-14-P-5105 awarded by the Department of Defense. Accordingly, the United States government has certain rights in the invention.

BACKGROUND OF THE INVENTION

1. Field of Invention

The present invention relates to network security and, specifically, to providing network security by observing, storing, and analyzing attributes of network connections.

2. Description of Related Art

As computer systems continue to grow and become a more and more integral part of everyday life, so do computer network systems. As the amount of data exchanged between parties continues to become more comprehensive, network infrastructures have become more and more robust to handle the volume of traffic. With the increased pervasiveness of computers and the ever-expanding network infrastructure comes the increased need for network security.

There are a wide array of systems and methods presently utilized in the art that provide network security. To protect networks, network managers typically employ anti-threat applications such as firewalls, intrusion detection systems, antivirus software, and spyware-detection software. The present disclosure focuses on intrusion detection systems ("IDS"), i.e., detecting threats that may have already circumvented any peripheral protection methods such as firewalls.

Available in the art are various methods and systems for IDSs. Two approaches for IDSs have emerged: flow-based systems and packet-based systems; some utilize a combination of both. These approaches examine network attributes such as data flow across a particular network node or a plurality of nodes, examining packet payloads in a data stream for potentially malicious information, examining packets for protocol information, and/or comparing packet header information against a predefined library of potentially malicious packets. However, all of the currently available network security solutions have inborn drawbacks.

Flow-based anomaly detection examines the inter-nodal flow of information across a network. These techniques rely on examining flow records for unusual amounts, directions, groupings, and characteristics of data flow patterns. The flow records are compared against a known parameter and, if the flow deviates from a predetermined threshold, the nodal flow is flagged as malicious.

Packet-based anomaly detection examines the packets of information traversing a network. These look at the raw data or "packet payload"—the substantive information contained in a data packet. This type of detection requires a combination of software and hardware that copies each packet of information traversing a network and, once copied, performs analysis on those packets to determine its potential maliciousness. However, this technique, while robust, requires vast amounts of computing and storage capability because there can be billions of packets sent across a network in a short period of time and the payloads for each packet must be copied and stored.

Accordingly, there is a need for a network behavioral detection system that observes, records, and analyzes network connections. This need has heretofore remained unsatisfied.

SUMMARY OF THE INVENTION

The present invention overcomes these and other deficiencies of the prior art by providing system and method for detecting anomalous network connections.

In one embodiment, the present invention provides a system for detecting network connections, deployable on a network, comprising a plurality of interconnected network nodes; a connection-based behavioral anomaly detection device ("CBAD") communicatively connected to at least one of the plurality of network nodes such that the CBAD may observe data traffic flowing through at least one node of the plurality of network nodes; an application loaded onto a first node of the plurality of network nodes, the application initializing a connection from the first node to a second node of the plurality of network nodes; and a computer-readable storage device communicatively connected to the CBAD; wherein the application transmits a plurality of data packets from the first node to the second node of the plurality of network nodes; the CBAD observes at least one of the plurality of data packets exchanged between the first node and the second node; the CBAD extrapolates packet information from at least one of the plurality of data packets observed; and the extrapolated packet information is stored on the storage device.

In another embodiment of the present invention, the CBAD compares the extrapolated packet information against historical data; and the CBAD flags the connection as anomalous if the extrapolated packet information exceeds at least one of a plurality of historical thresholds.

In another embodiment of the present invention, the extrapolated packet information comprises information pertaining to at least one of the parameters selected from the group consisting of: the packet's source node, the packet's destination node, intermediately connected nodes between the source and destination nodes, the sending application, the duration of the connection between the source and destination nodes, the amount of data transferred between the source and destination nodes, the packet's encryption, the time and date that the connection between the source node and the destination node was initialized, the time and date that the connection between the source node and the destination node was terminated, port number of the packet's source node, port number of the packet's destination node, the communications protocol, the relative amounts of data sent and received by the packet's source node, and the relative amount sent and received by the packet's destination node.

In another embodiment of the present invention, the system further comprises a third network node of the plurality of network nodes intermediately connected between the first node and second node; wherein the application sends the data packets from the first node to the second node through the third node; and the CBAD observes the data packets exchanged between the first node and the second node on at least one of the first node, the second node, or the third node.

In another embodiment of the present invention, at least one of the plurality of historical thresholds is dynamically updated based on stored extrapolated packet information.

In another embodiment of the present invention, the CBAD receives extrinsic information pertaining to the observed data packets from a source other than the first node or the second node; and the comparison between the observed packet information and historical data considers the extrinsic information.

In another embodiment of the present invention, at least one of the plurality of historical thresholds is dynamically updated based on the extrinsic information.

In another embodiment of the present invention, the CBAD sends a notification to one of the plurality of nodes if the connection is flagged as anomalous.

In another embodiment, the present invention provides a method for detecting connections within a network comprising: initializing a connection from an application loaded on a first network node of a plurality of interconnected network nodes, to a second network node of the plurality of interconnected network nodes; sending, from the application, a plurality of data packets to the second network node; observing, at a CBAD communicatively connected to at least one node of the plurality of interconnected network nodes, packet information from at least one of the plurality of data packets exchanged between the first node and the second node; extrapolating, at the CBAD, packet information from at least one of the plurality of data packets exchanged between the first node and the second node; and storing, on a computer-readable storage device communicatively connected to the CBAD, the extrapolated packet information.

In another embodiment of the present invention, the method further comprises comparing, at the CBAD, the extrapolated packet header information against historical data; and flagging the network connection as anomalous if at least one of a plurality of historical thresholds is exceeded.

In another embodiment of the present invention, the method further comprises updating at least one of the plurality of historical thresholds based on the extrapolated packet information.

In another embodiment of the present invention, the method further comprises relaying, at a third node of the plurality of network nodes, data packets exchanged between the first node and the second node; wherein the CBAD observes the data packets on at least one of the first node, the second node, or the third node.

In another embodiment of the present invention, the method further comprises receiving, from a source other than the first node and the second node, extrinsic information relating to at least one of the observed data packets exchanged between the first node and second node; wherein the comparison between the extrapolated packet information against historical data further considers the extrinsic information.

In another embodiment of the present invention, at least one of the plurality of historical thresholds is further updated based on the extrinsic information.

In another embodiment, the present invention discloses a method for detecting connections within a network comprising: observing, at a connection-based behavioral anomaly detection device ("CBAD"), a plurality of data packets transferred from an application loaded onto a first node of a plurality of interconnected network nodes to a second node of the plurality of nodes interconnected network nodes; extrapolating packet information from at least one data packet of the plurality of data packets; and comparing the extrapolated data packets against historical data; wherein the CBAD is operatively connected to at least one of the nodes of the plurality of interconnected network nodes; and the application initialized a connected with the second node.

In another embodiment of the present invention, the method further comprises the step of storing, at a computer-readable storage device operatively connected to the CBAD, the extrapolated packet information; wherein the historical information comprises previously extrapolated packet information; and the CBAD flags the connection as anomalous if the extrapolated packet information exceeds at least one of a plurality of historical thresholds.

In another embodiment of the present invention, the extrapolated packet information comprises information pertaining to at least one of the parameters selected from the group consisting of: the packet's source node, the packet's destination node, intermediately connected nodes between the source and destination nodes, the sending application, the duration of the connection between the source and destination nodes, the amount of data transferred between the source and destination nodes, the packet's encryption, the time and date that the connection between the source node and the destination node was initialized, the time and date that the connection between the source node and the destination node was terminated, port number of the packet's source node, port number of the packet's destination node, the communications protocol, the relative amount of data sent and received by the packet's source node, and the relative amount sent and received by the packet's destination node.

In another embodiment of the present invention, at least one of the plurality of historical thresholds is dynamically updated based on stored extrapolated packet information.

In another embodiment of the present invention, the CBAD receives extrinsic information pertaining to the observed data packets from a source other than the first node or the second node; and wherein the comparison between the observed packet information and historical data considers the extrinsic information.

In another embodiment of the present invention, at least one of the plurality of historical thresholds is dynamically updated based on the extrinsic information.

In another embodiment of the present invention, the CBAD sends a notification to one of the plurality of nodes if the connection is flagged as anomalous.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1A:
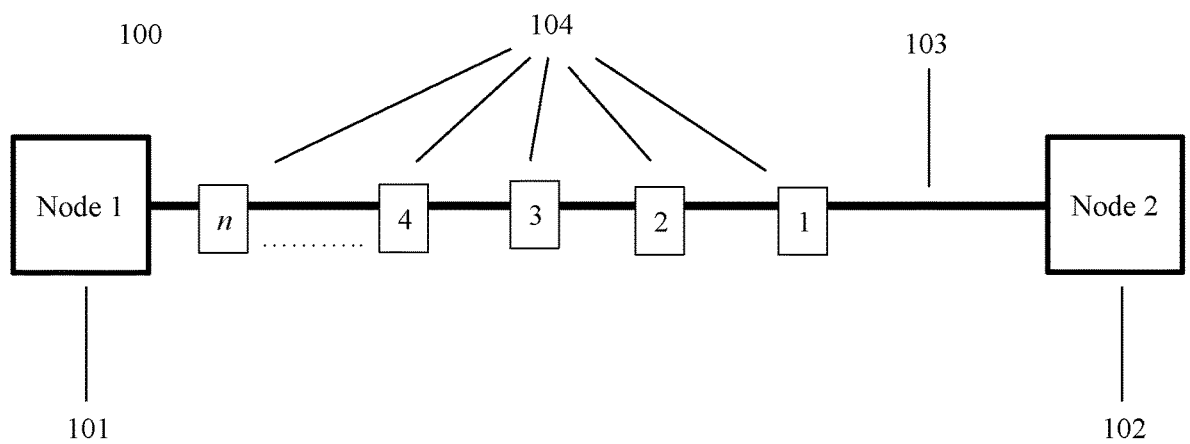
FIG. 1A illustrates a network connection between two nodes, according to an exemplary embodiment of the present disclosure.

Further features and advantages of the invention, as well as the structure and operation of various embodiments of the invention, are described in detail below with reference to the accompanying FIGS. 1-4. Although the invention is described in the context of being deployed on an interconnected set of nodes, the present invention may be implemented on any network architecture or configuration such as, but not limited to a network comprising a single segment where all connected devices are connected to a single switch or hub with no routing to external networks; a network comprising of one or more segments that all interconnect through the use of one or more routers (such as a company network at a single site with network segments representing locations within the site, or functional operation of systems within the organization); a hierarchical network structure comprising several network segments at various "depth" levels within an organization such as a large corporate network covering several locations and sub-locations.

In an exemplary embodiment of the present disclosure, a computer network comprises a Connection-based Network Behavioral Anomaly Detection system (hereinafter, "CBAD") deployed thereon. The computer network comprises a plurality of nodes interconnected, directly or indirectly, through a plurality of network paths. The CBAD may comprise a learning mode and a monitoring mode. In learning mode, the CBAD monitors network activity to build a baseline from which future statistical analysis may be performed. In monitoring mode, the CBAD monitors network activity without updating the baseline formed during learning mode. Although the CBAD's learning and monitoring may be discussed as running independently, the two modes may be implemented concurrently, in whole or in part, without departing from the embodiments contemplated.

In learning mode, the CBAD monitors network activity and builds a record of the network connections made by applications sending information across the network. To accomplish this, the CBAD accesses data traffic on the network through a network tap. The CBAD monitors data traffic of the network as it passes through the network, via the network tap, and extrapolates data from the data packets traversing the computer network. Exemplary extrapolated data may comprise packet header information including, without limitation to, the originating node's network address and the destination node's network address. Exemplary extrapolated data may further comprise a time stamp and/or date stamp. The extrapolated packet information is then stored on a computer-readable storage medium operatively connected to, or integrated in, the CBAD system.

In monitoring mode, the CBAD monitors the network for connections initialized. When detected, the CBAD extrapolates information pertaining the observed connection including, for example, the source and destination addresses, the time stamp, and the amount of data flowing in each direction. The CBAD then compares the observed connection against the historical data formed during the learning mode by performing statistical analysis. For example, a connection to a database server may have a significantly longer connection duration than historical connections to the particular server, which may indicate system compromise through a database vulnerability. If the comparison results in an anomaly, the CBAD flags the connection. In some embodiments, the CBAD may be configured such that it may take further remedial measures upon determining a connection is anomalous, for example, terminating the connection and/or quarantining the application, connection, node, and/or the internodal network path.

In another exemplary embodiment of the present disclosure and with reference to FIG. 1A, a computer network 100 comprises a first node 101 and a second node 102. The first node (Node 1) 101 and the second node (Node 2) 102 may comprise any device that is capable of connecting to another device through a wired or wireless connection. Nodes 1 and 2 101, 102 are connected via network connection 103. Node 1 101 comprises an application loaded thereon (not shown). To perform its functionality, the application sends information to Node 2 102. The application initializes a network connection 103 to Node 2 102 and sends information thereto over the connection 103. To accomplish the information transfer, Node 1 101 sends a plurality of network packets 104 across the network connection 103. Transferring network packets over a network connection is readily apparent to one skilled in the art.

Figure 1B:
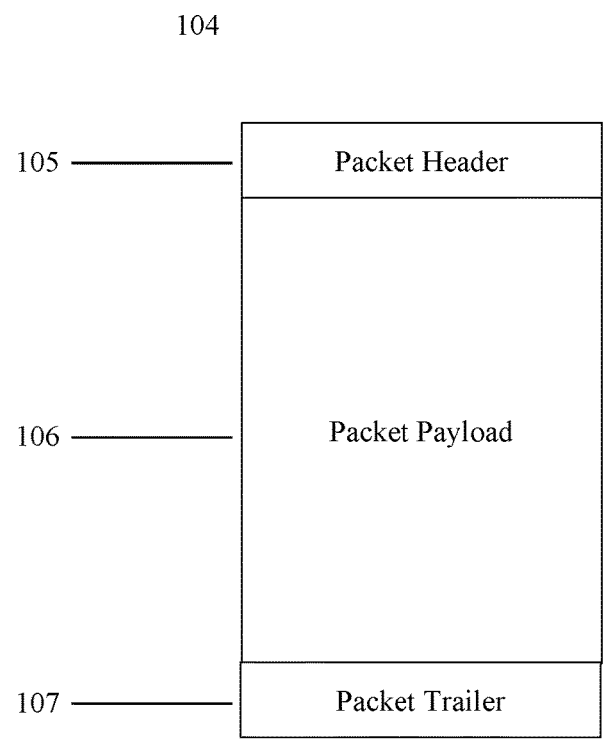
FIG. 1B illustrates a graphical representation of a data packet, according to an exemplary embodiment of the present disclosure.

In another exemplary embodiment of the present disclosure and with reference to FIG. 1B, the data packet 104 comprises a packet header 105 and a packet payload 106. Some data packets 104 may further comprise a packet trailer 107. For example, internet protocol ("IP") packets may not comprise a packet trailer 107, however the embodiments contemplated are not limited to packets having a packet trailer 107. The packet header 104 and the packet trailer 107 comprise information for delivering the packet payload 106. For example, the packet header 105 and packet trailer 107 may comprise source and destination network addresses, error detection codes, the number of bytes sent and/or received, and sequencing information. The packet payload 106 comprises data that is carried on behalf of the application. Generally, the packet payload 106 is of variable length, up to a maximum that is set by the network protocol and sometimes the equipment on the route. In some instances, the packet payload 106 may be broken into smaller packets, as required by the network capabilities. Further, the packet payload 106 may be encrypted. Packet payloads, their construction, and use is readily apparent to one skilled in the art.

Figure 2A:
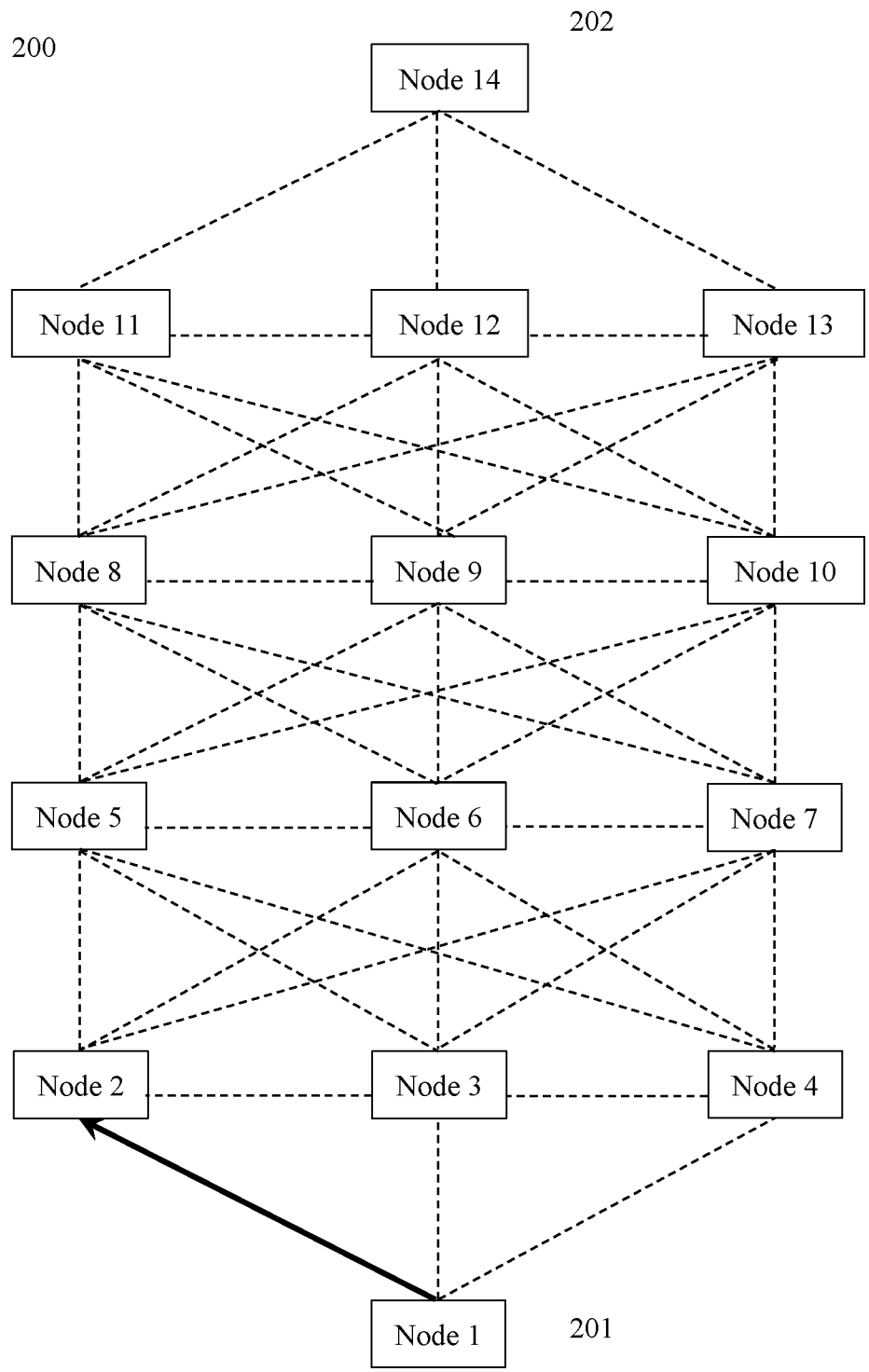
FIG. 2A illustrates a computer network system, according to an exemplary embodiment of the disclosure.

In an exemplary embodiment of the present disclosure and with reference to FIG. 2A, the computer network 200 comprises a plurality of Nodes 1-14, having the CBAD deployed thereon. To be operatively deployed on a network, the CBAD may be connected to every node in a system. Alternatively, the CBAD may be connected to fewer than all nodes. Although only 14 nodes are shown, any number of nodes can be used without departing from the embodiments contemplated herein. Nodes, as used herein, comprises any networked device capable of sending, receiving, and/or relaying a network signal. For example, a node may include, without limitation to, a computer, a mobile device, a server, a network hub, a network switch, a modem, a router, a repeater, a bridge. Further, the nodes are connected though a plurality of network paths, shown as dashed lines ( - - - ) Although the nodes are shown as having specific network paths, any number of network paths may be used. For example, Node 1 is shown as having a direct network path to Nodes 2-4. However, Node 1 may comprise a direct network path to any other node, without departing from the embodiments contemplated herein. In such an example, Node 1 may comprise a direct network path to all nodes in the computer network 200, or less than all nodes. Further, any node shown may be further connected to an external device (not shown) without departing from the embodiments contemplated herein. The network paths shown may comprise any wired or wireless connection, or any combination thereof, without departing from the embodiments contemplated herein.

The CBAD is deployed on the network 200 using a network tap interfacing the network at one or more of the nodes and/or in between nodal connections. A network tap, sometimes referred to as a terminal access point, is a subsystem that monitors events on a local network. The tap may be a dedicated hardware device that monitors the network traffic passing through a node. Network taps are commonly used in computer network system security systems and its application is readily apparent to one skilled in the art. The specific nodes on which a network tap is installed will vary depending on the network architecture. Typically, the network taps will be deployed such that all traffic across a network will be observed by the plurality of network taps.

As shown, for example, Node 1 establishes a connection with Node 2. The CBAD may be deployed via a network tap at Node 1, at Node 2, and/or along the network path between Nodes 1 and 2. During the connection, the CBAD monitors the data packets traversing the network and extrapolates the relevant packet header information, for example, Node 1's network address, Node 2's network address, and the time and date the connection occurred. In learning mode, the CBAD will store this information. In the event Node 1 had previously established a connection with Node 2, the instant connection will be integrated into that historical data. In monitoring mode, the CBAD will compare the instant connection with historical data previously recorded. Comparisons the CBAD may examine include, but are not limited to, whether and to what degree Node 1 has ever initialized a connection with Node 2, the type of connections historically made between Node 1 and Node 2, the type of information that was historically exchanged between Nodes 1 and 2, the amount of data that has historically been exchanged between Nodes 1 and 2, the connection duration that has historically occurred between Nodes 1 and 2, the applications that historically have initialized connections between Nodes 1 and 2, whether the data is encrypted, the time of day and/or dates on which Nodes 1 and 2 have historically initialized a similar connection, and/or the physical or geographic locations of Nodes 1 and 2.

If any of the analyzed parameters are sufficiently anomalous, the CBAD will flag the connection. The CBAD may comprise a threshold for determining whether a connection is sufficiently anomalous to warrant being flagged. The threshold may be fixed and/or predetermined. For example, the threshold may be set to six standard deviations from the observed historical data. In such an example, if the amount of data that is being transferred between the nodes in the instant connection is more than six standard deviations from the historical average, the connection is flagged as anomalous. The threshold need not be predetermined or fixed. For example, the CBAD may, during learning mode, construct a threshold that is appropriate based on the historical data. Further, different parameters may have different thresholds.

Whether a connection is flagged as anomalous need not depend on a single threshold being met. For example, the CBAD may find that two parameters are just under their respective thresholds. In such an instance, the CBAD may be configured to flag the connection as anomalous even though no thresholds were actually exceeded. It is noted that the CBAD's learning mode and monitoring mode may run concurrently. Accordingly, the thresholds may be continuously varied depending on observed network activity. Additionally, the CBAD may vary the thresholds based on information that is extraneous to the network.

Once a connection is flagged, the CBAD may further perform a variety of tasks. For example, the CBAD may prepare a report detailing the connection, its parameters, and the reason(s) why the connection was flagged. Such a report may be sent to a network administrator for review. In another example, the CBAD may terminate a flagged connection. The CBAD may allow subsequent similar connections or may prevent them in their entirety. In another example, the CBAD may quarantine the node from which the flagged connection originated; that is, the CBAD will prevent that node from initializing any other connections with any other nodes. In another example, the CBAD may prevent further connections from the originating application while allowing other applications on that node to establish connections. In another example, the CBAD may send a notification to the originating node detailing that the connection was flagged and/or blocked. In another example, the notification sent to the flagged node may be configured so that a user of that node will perceive the notification to be benign. This may give the CBAD and/or a network administrator the opportunity to examine the reasons why the connection was flagged without alerting the user that the connection was terminated for security reasons. In the event the user was accessing the node for nefarious purposes, such a benign notification may allow a network administrator time to discover additional information including the user's identity, without alerting the user of the investigation.

Figure 2B:
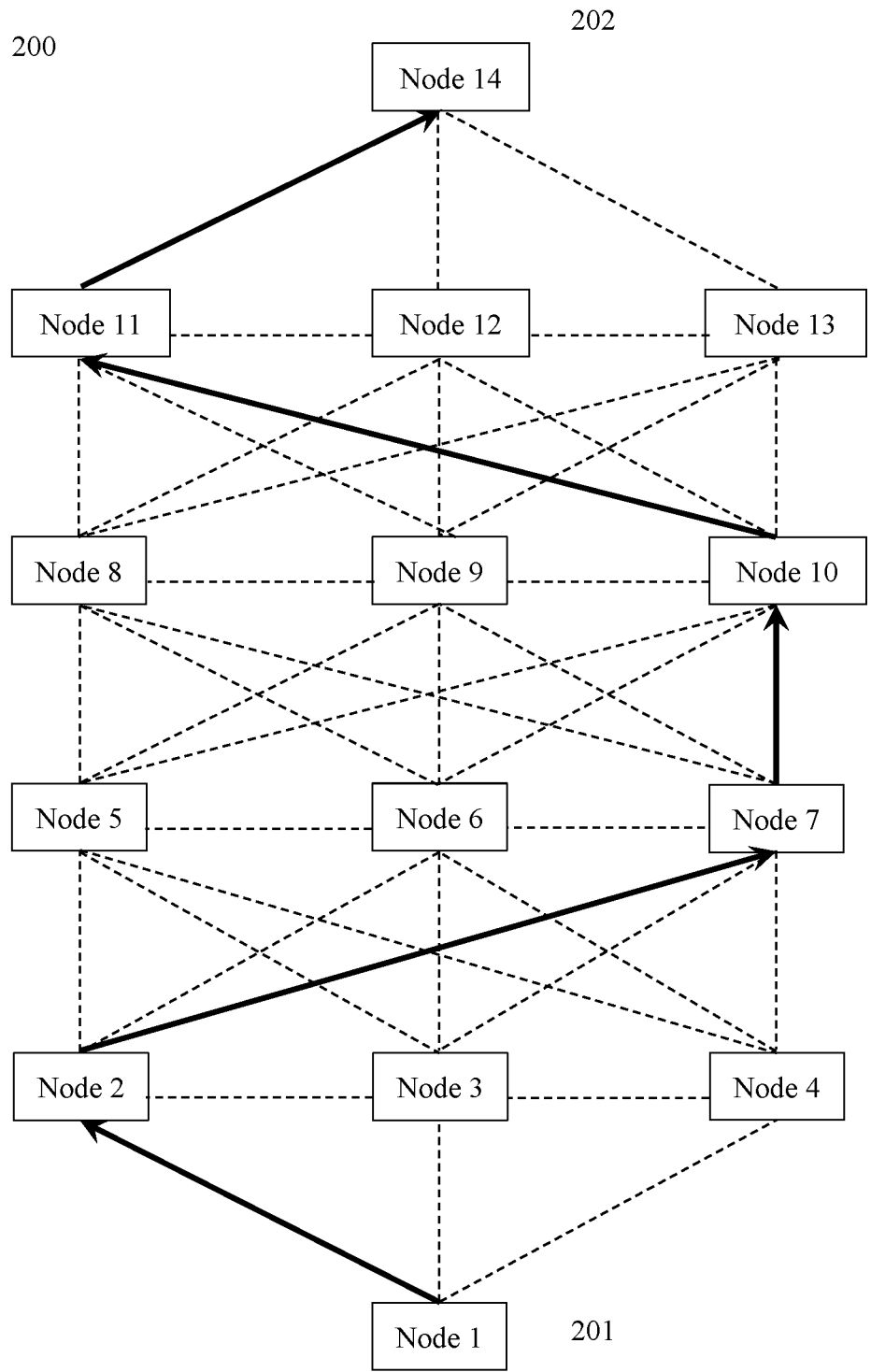
FIG. 2B illustrates a computer network system having a single connection path, according to an exemplary embodiment of the disclosure.

In another exemplary embodiment of the present disclosure and with reference to FIG. 2B, the CBAD may monitor a plurality of connections during the transmission of information across a plurality of nodes in the network 200. For example, as shown, an application loaded on Node 1 initializes a connection with Node 14. However, Node 1 may not be able to connect directly to Node 14. For example, Nodes 1 and 14 may be embodied by computers. Further, the user of Node 1 desires to send an email to the user of Node 14. In such an example, Node 2 may be embodied by a wireless router to which the sending user's computer (Node 1) is connected. Node 7 may be embodied by a network switch to which the wireless router (Node 2) is connected. Node 10 may be embodied by an email server to which the network switch (Node 7) sends the sending user's email. Node 11 may be embodied by a second network switch to which the email server (Node 10) sends the sending user's email. Finally, the second network switch (Node 11) sends the email to the receiving user's computer (Node 14). In such an example, the CBAD may observe, monitor, track, record, and/or analyze each connection between each discrete node, the overall network path from Node 1 to Node 14, and/or subset of the intermediate connections between Nodes 1 and 14. If the CBAD determines any of the network connections along the path, or the overall path itself, are sufficiently anomalous, any of the individual connections and/or the entire path may be flagged. Specific patterns and paths of network transmission will vary depending on many factors including, but not limited to, the type of information to be transmitted across the network, the demands of the network, and the network's specific architecture.

Figure 2C:
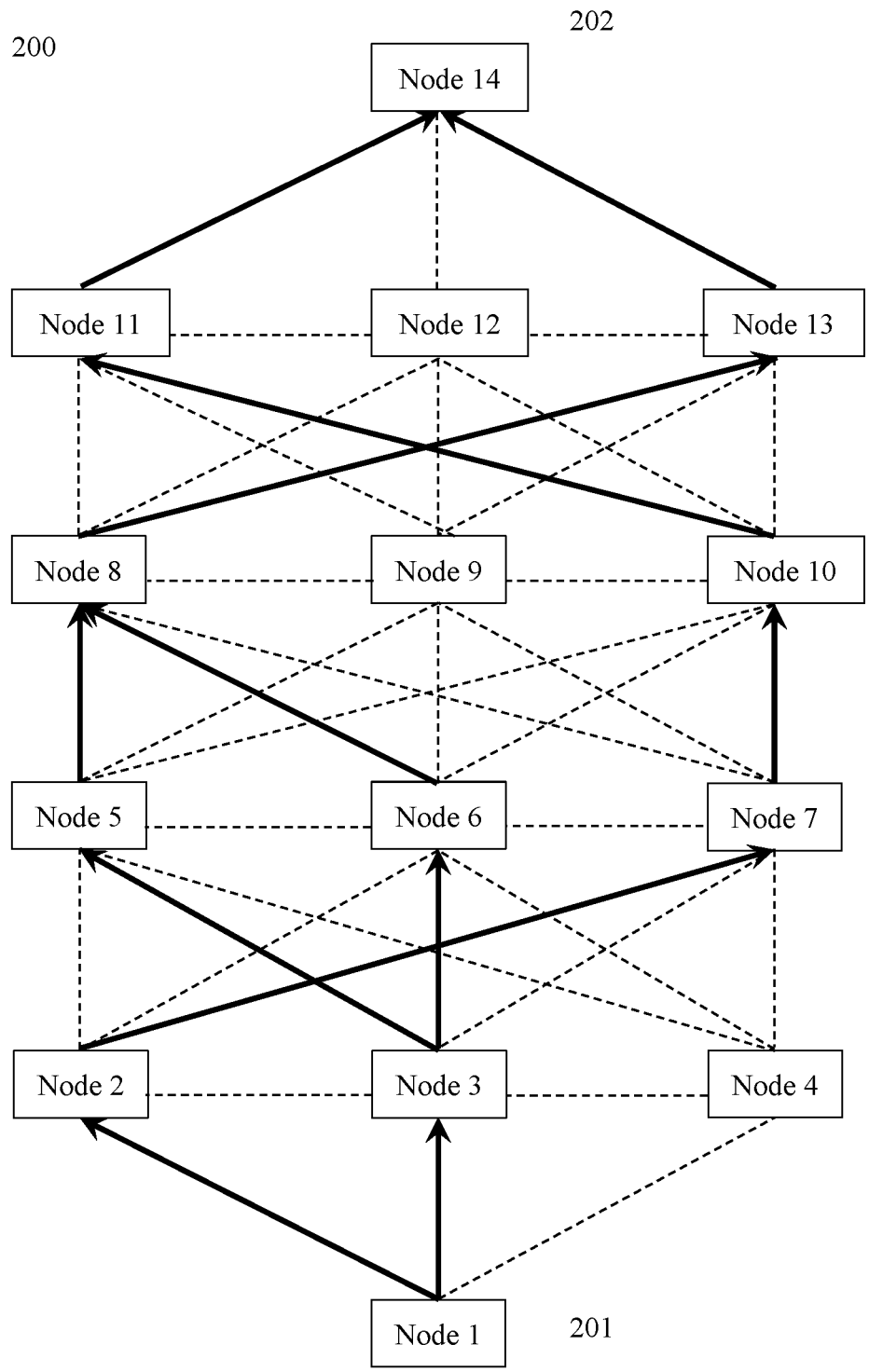
FIG. 2C illustrates a computer network system having multiple network paths, according to an exemplary embodiment of the disclosure.

In another exemplary embodiment of the present disclosure and with reference to FIG. 2C, an application may utilize a plurality of network paths to transmit information from one node to another, across the network 200. In such an instance, the CBAD may monitor, analyze, track, and/or record each connection across the network 200 and/or the entire network path. Additionally, the CBAD may recognize that alternative paths are taken when an application on one node sends information to another node. For example, Node 1 may be embodied by a computer connected to Nodes 2 and 3, both embodied by wireless routers. The CBAD may recognize that both Nodes 2 and 3 are wireless routers and the computer (Node 1) may alternatively send information through either. In such an example, the CBAD may recognize that specific types of hardware are appropriate for connection even though that specific node may have not historically been utilized.

In determining whether a connection or connections are anomalous, the CBAD may rely on many parameters, both internal and external to the network. For example, the CBAD may examine any particular connection with respect to historical data for that particular node. Additionally, the CBAD may rely on that node's functional context as it relates to network 200. For example, whether that node is embodied by a computer or a network switch may be considered when analyzing a particular network connection. In such an embodiment, the CBAD may minimize false-positives by taking into account that the presumptively anomalous connection is originating from a functional equivalent of a historically "normal" node. For example, the CBAD may have historically perceived a particular connection originating from a specific node—a router, for example. The CBAD may perceive a connection from a node other than that which has historically been observed—another router. In this example, the CBAD may recognize that the instant connection is coming from a router—the functional equivalent of historically observed connections—and that the router has previously been used within the same network for other connections. From these two historical observations, the CBAD may recognize that (1) the instant router has previously been used on the network, thereby mitigating the possibility that it is malicious and (2) that the instant connection, though not historically observed, may be anticipated as it is coming from the functional equivalent of a historically observed router.

Additionally, the CBAD may consider factors that are external to the network 200 in analyzing a particular connection. For example, the network 200 may be embodied by a humanitarian relief organization. In such an example, the organization will generally utilize the network 200 for non-emergency services and general fund-raising efforts. However, when a disaster strikes, a hurricane for example, the network's 200 activity will have a different connectivity pattern, due to the different demands of the network's 200 users. In this example, the hurricane may be an external factor that the CBAD considers when analyzing the network's 200 pattern. That is, the CBAD may recognize that the otherwise anomalous network connectivity patterns are not in fact anomalous because the network 200 is being used for legitimate purposes.

Figure 2D:
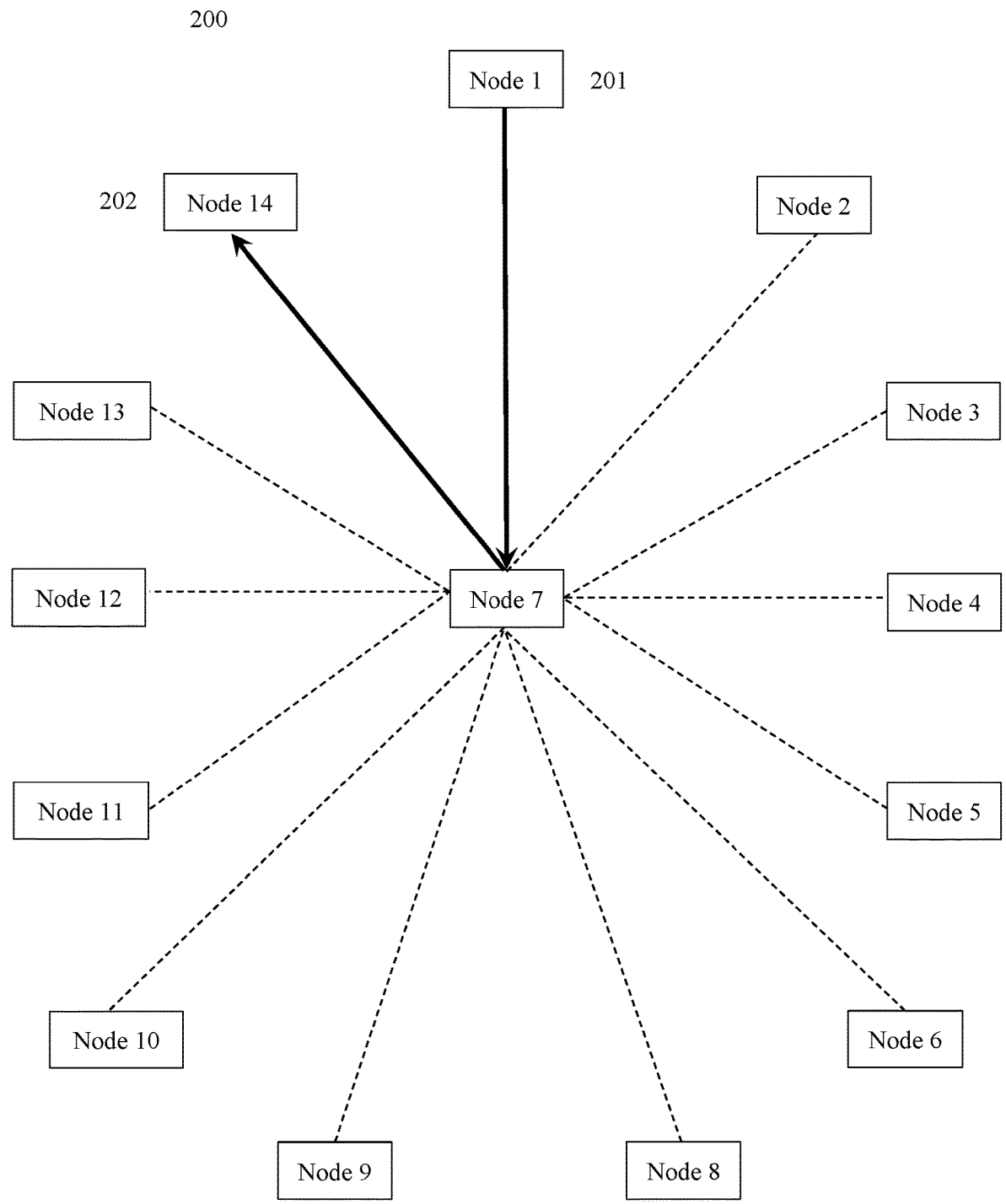
FIG. 2D illustrates a computer network system having all nodes interconnected through a single node, according to an exemplary embodiment of the disclosure.

In another exemplary embodiment of the present disclosure and with reference to FIG. 2D, the CBAD may not be connected to each node in the network 200 to observe all traffic on the network 200. As shown, all nodes are interconnected through Node 7. In such a configuration, Node 7 may be embodied by a network router, for example. Thus, to observe all data traffic on the network 200, the CBAD need only be connected to Node 7 as all network traffic passes through it.

Figure 3A:
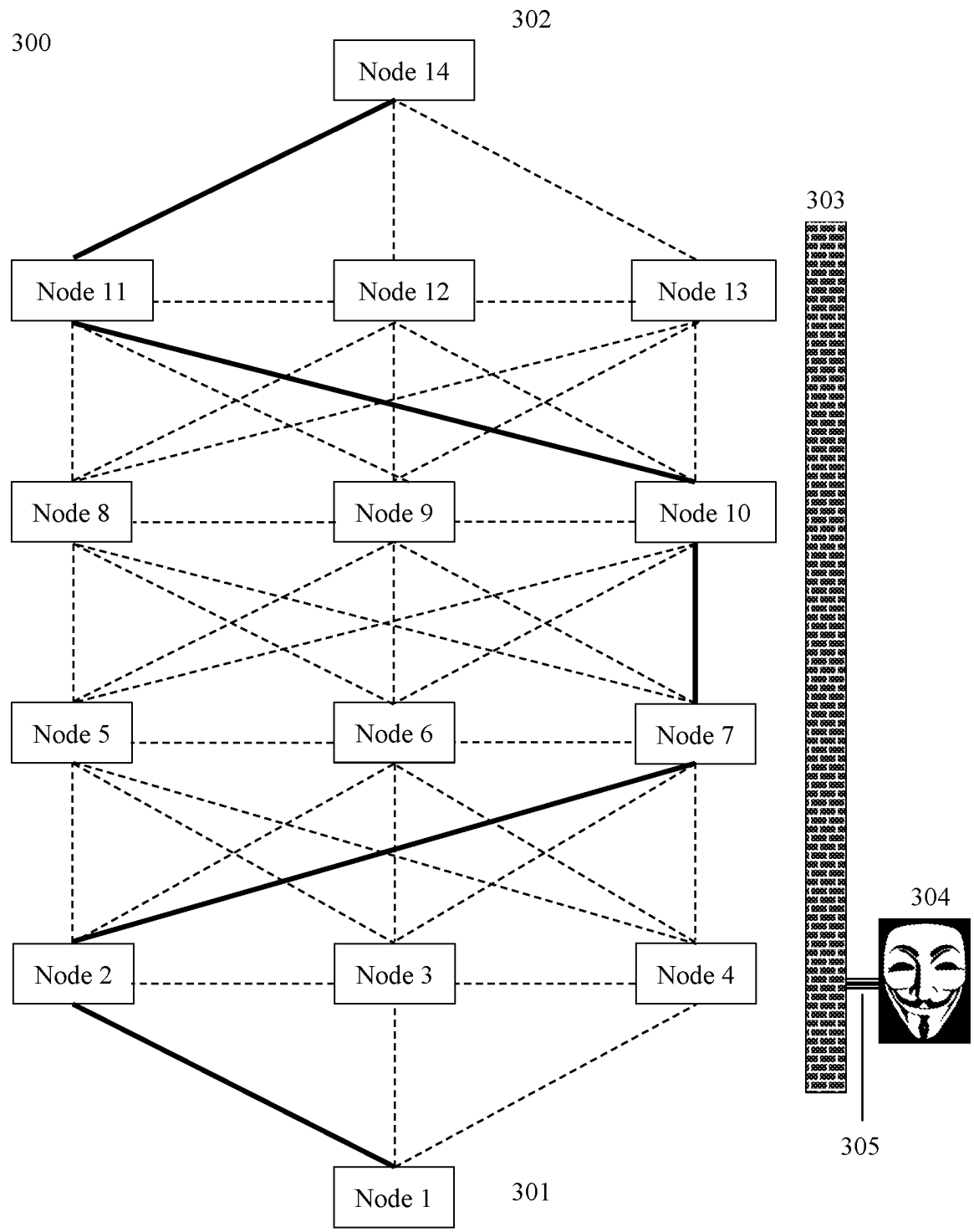
FIG. 3A illustrates a computer network system with a firewall, according to an exemplary embodiment of the disclosure.

In another exemplary embodiment of the present disclosure and with reference to FIG. 3A, the network 300, having the CBAD deployed thereon, comprises a plurality of nodes are interconnected and the network 300 is protected from an external attack by firewall 303. The hacker 304 may attempt to access the network 300 through a connection 305 but is blocked by the firewall 303. The CBAD may be configured so that it interfaces with the firewall 303. The firewall 303 interfaces with the CBAD such that the CBAD is notified that the incoming connection 305 was blocked. Further, the CBAD and the firewall 303 may exchange information relating to the thwarted attack.

Figure 3B:
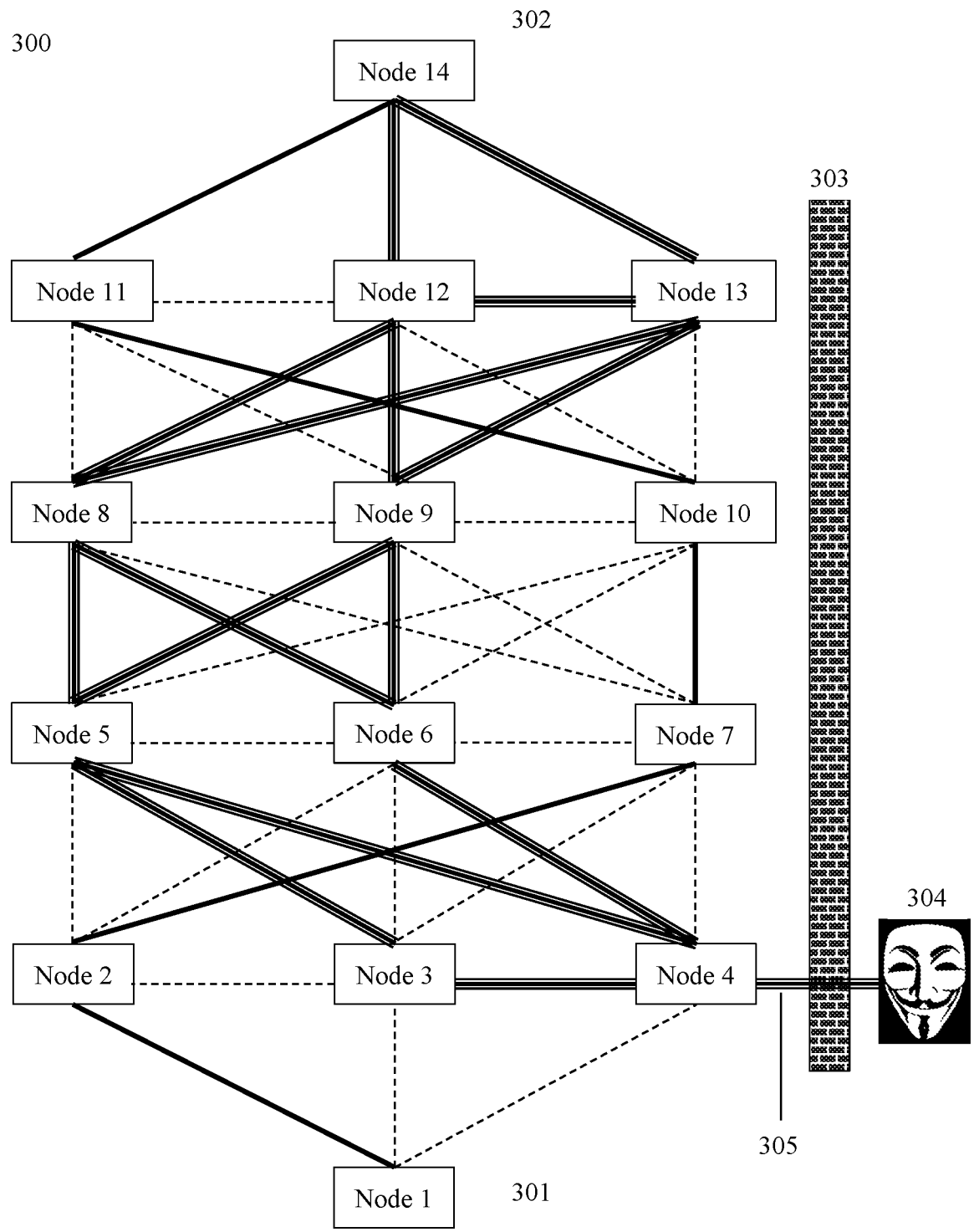
FIG. 3B illustrates a computer network system with a firewall, according to an exemplary embodiment of the disclosure.

In another exemplary embodiment of the present disclosure and with reference to FIG. 3B, the hacker 304 may penetrate the firewall 303 and access the network 300. In such an instance, the CBAD may recognize that connection 305 originates from the hacker 304 through a previous connection that was blocked by firewall 303. Additionally, the CBAD may analyze the internodal connections initialized by the hacker's connection 305 by its connections across the network 300 as compared to observed historical data. In either case, the CBAD may flag the connections as anomalous and proceed with the appropriate security measures.

Figure 3C:
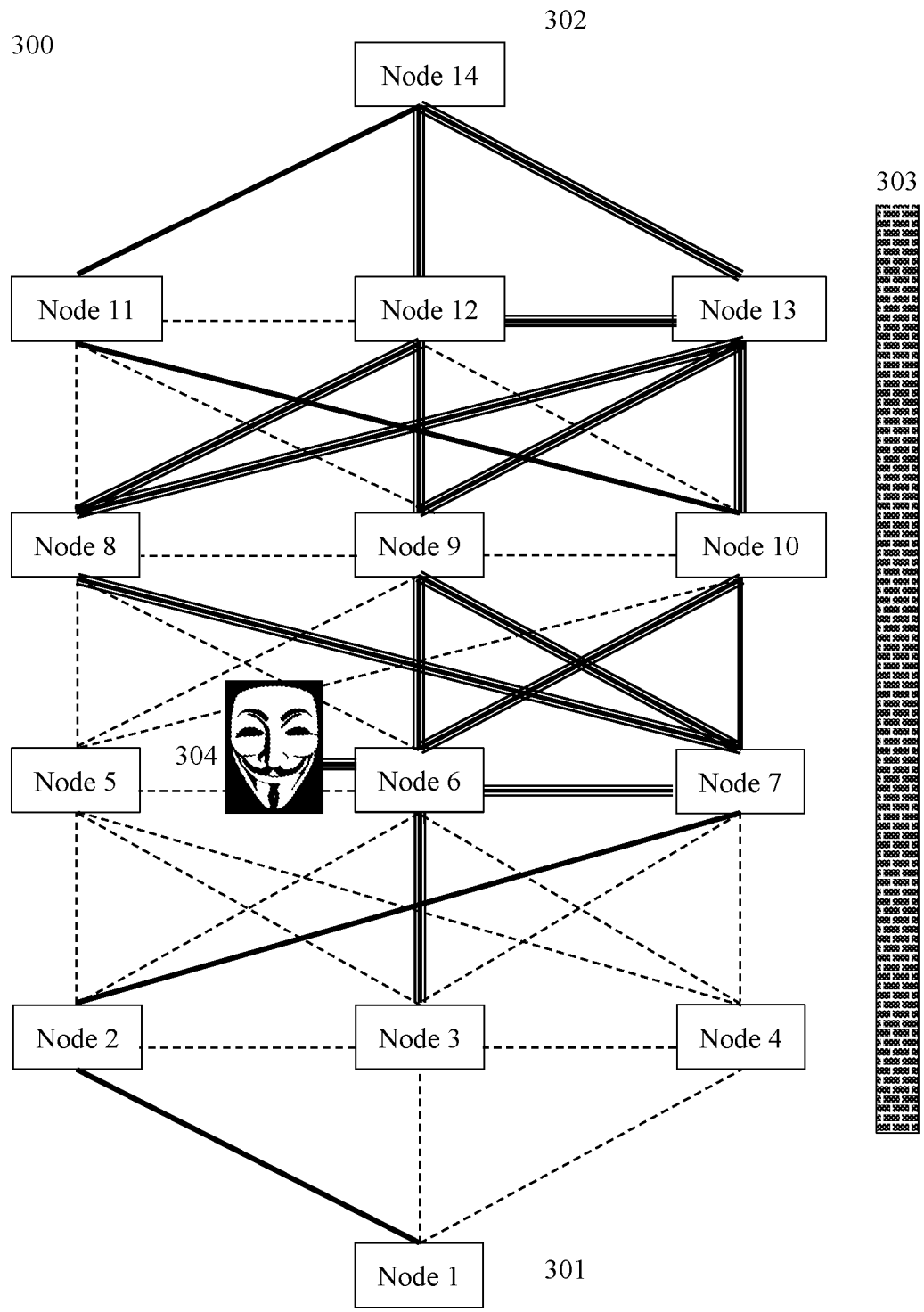
FIG. 3C illustrates a computer network system with a firewall, according to an exemplary embodiment of the disclosure.

In another exemplary embodiment of the present disclosure and with reference to FIG. 3C, the hacker 304 may have physically bypassed the firewall 303 by connecting directly to Node 6 within the network 300. For example, the hacker 304 may use a computer embodying Node 7. In such an example, the hacker 304 may load a malicious application on to the computer (Node 7) in an attempt to gain access to other nodes on the network 300. The CBAD will recognize the hacker's 304 application's activity as anomalous because such connections will not have previously initialized those connections on the network 300. The CBAD will flag the connections and take the appropriate action. Notably, such a configuration is especially susceptible to attack because, by interfacing with a node already established on the network 300, the firewall 303 will not observe the hacker's 304 nefarious connection.

Figure 4A:
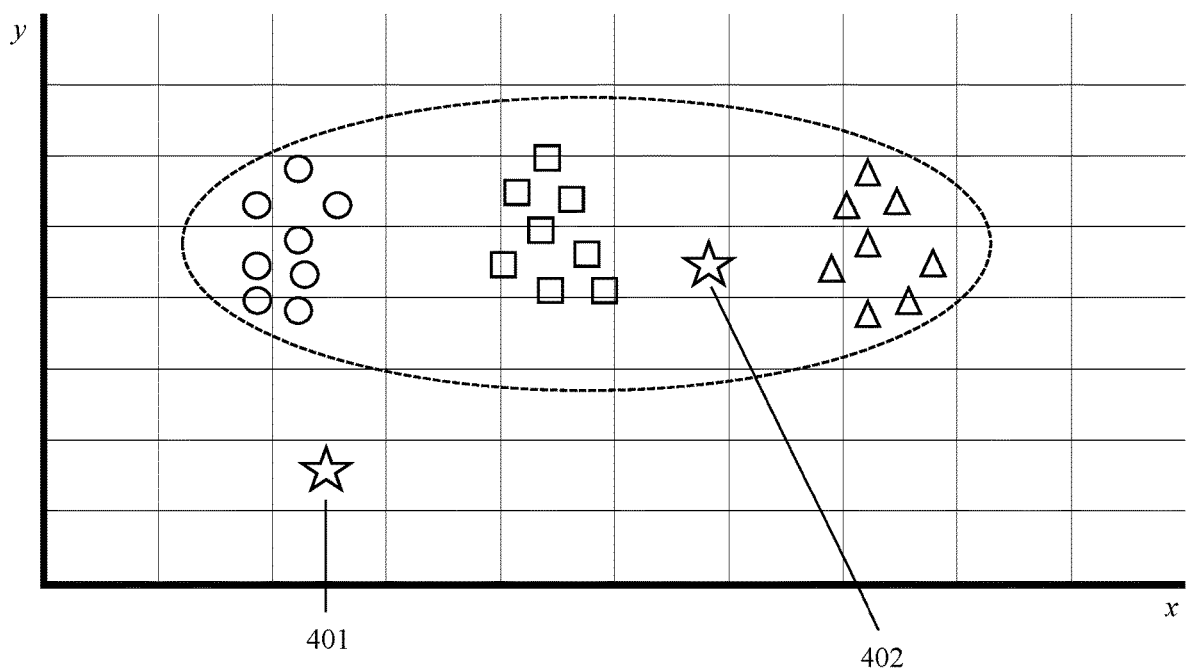
FIG. 4A illustrates a graphical representation of a historically observed norm, according to an exemplary embodiment of the present disclosure.

In another exemplary embodiment of the present disclosure and with reference to FIG. 4A, the CBAD's statistical analysis is represented by a graph 400, having historically observed data points plotted thereon. The data points comprise three subsets of data corresponding to three separate parameters, depicted as circles, squares, and triangles. A first nefarious connection 401 and a second nefarious connection 402 are depicted as stars. In analyzing the first nefarious connection 401, the CBAD may recognize that it is anomalous because it is outside the historically observed norm, represented by a dashed line. In such an instance, the CBAD may flag the first nefarious connection 401 as anomalous.

Figure 4B:
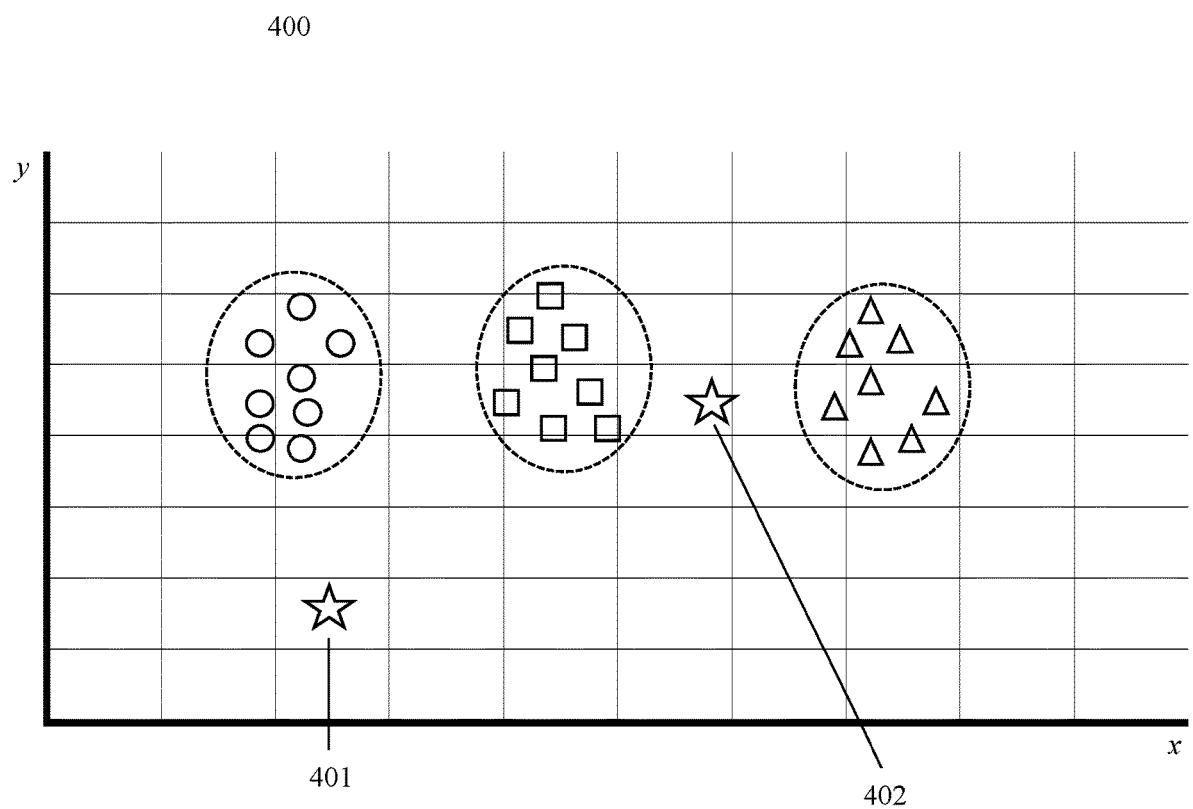
FIG. 4B illustrates a graphical representation of a historically observed norm considering the data's context, according to an exemplary embodiment of the present disclosure.

In another exemplary embodiment of the present disclosure and with reference to FIG. 4B, the CBAD's statistical analysis may include the context of the historically observed data. In constructing the historically observed norm of a system, the CBAD may recognize that certain types of data tend to cluster together. In such an instance, the CBAD may construct individual historical norms based on the specific context of the data points. The individual historical norms are shown as dashed lines encapsulating three subsets of data, depicted as circles, squares, and triangles. In such a configuration, the CBAD may flag the first nefarious connection 401 as anomalous (as also shown in FIG. 4A). However, in contrast to FIG. 4A, the CBAD may also flag the second nefarious connection 402 as being anomalous.

Figure 4C:
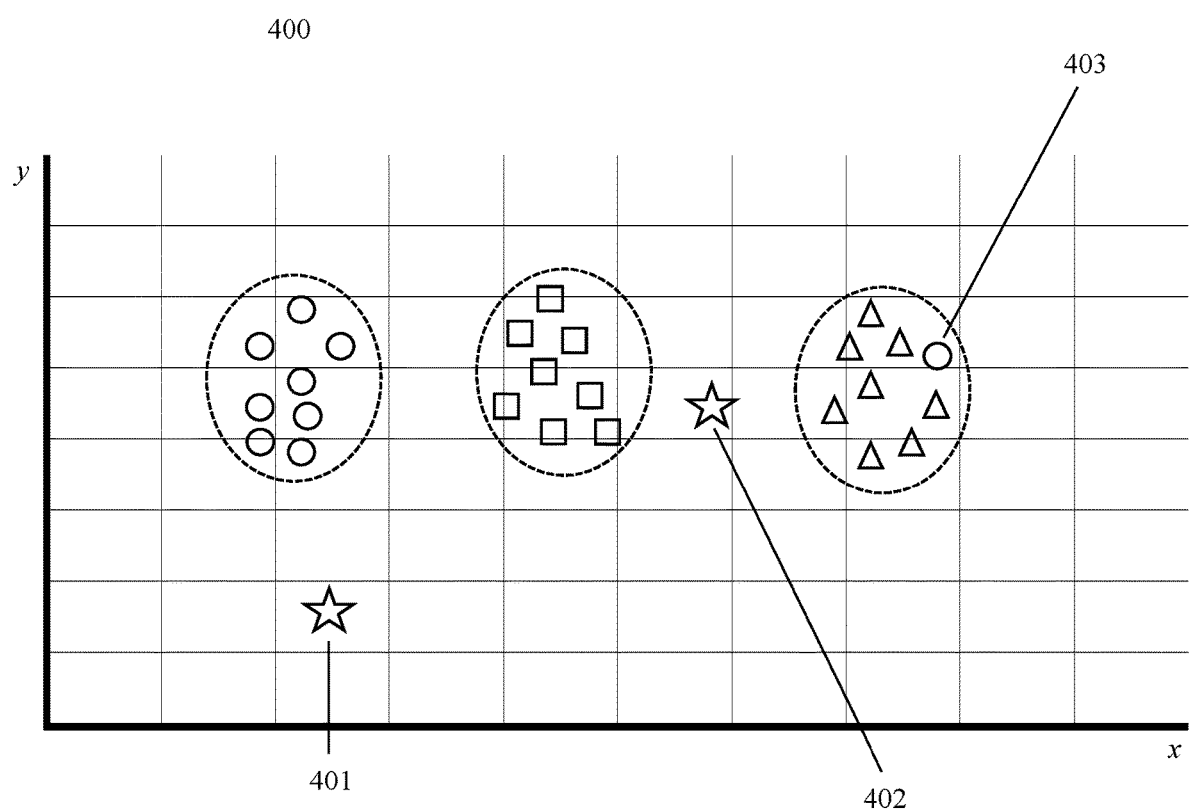
FIG. 4C illustrates a graphical representation of a historically observed norm considering the data's context, according to an exemplary embodiment of the present disclosure.

In another exemplary embodiment of the present disclosure and with reference to FIG. 4C, the CBAD system may flag a connection as anomalous even though it falls within a historically observed norm. In this embodiment, anomalous connection 403 may be flagged because, although it falls within an established norm, that norm does not correspond to its specific attributes.

As an illustrative example, assume that graph 400 represents distance traveled (x-axis) plotted against the amount of time needed to travel that distance (y-axis) based on three modalities of transportation: circles represent distance traveled by walking, squares represent distance traveled using a bicycle, and the triangles represent distance traveled using an automobile. As expected, an individual can travel further using an automobile (triangles) than they could using a bicycle (squares) or walking (circles), in a given amount of time. Further, each modality of transportation has varying distance/time correlations but, notably, the individual modalities are similarly situated and clustered. This represents that while different people walk/ride/drive at varying speeds, the modalities will tend to cluster based on the modality of transportation. In this example, the CBAD will recognize that data point 403 is anomalous because, ostensibly, a person cannot walk as fast as an automobile. This example illustrates that while only two global parameters are analyzed, time and distance traveled, the CBAD may utilize additional information common to a subset of data points (modality of transportation) in flagging an observed data point as anomalous.

Although the graphical representation 400 is shown as having three subsets of data, any number of data clusters may be utilized without departing from the embodiments contemplated herein. Further, although the graphical representation 400 is shown as having two parameters, x and y, the CBAD may utilize any number of parameters to cluster the data points, without departing from the embodiments contemplated herein.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A system for detecting network connections, deployable on a network, comprising:
    a plurality of interconnected network nodes;
    a connection-based behavioral anomaly detection device ("CBAD") communicatively connected to at least one of the plurality of network nodes such that the CBAD may observe data traffic within at least one node of the plurality of network nodes;
    an application loaded onto a first node of the plurality of network nodes, the application initializing a connection from the first node to a second node of the plurality of network nodes;
    a computer-readable storage device communicatively connected to the CBAD;
    wherein the application transmits a plurality of data packets from the first node to the second node of the plurality of network nodes; the CBAD observes at least one of the plurality of data packets exchanged between the first node and the second node; the CBAD extrapolates packet information from at least one of the plurality of data packets observed; and the extrapolated packet information is stored on the storage device.

2. The system of claim 1, wherein the CBAD compares the extrapolated packet information against historical data; and wherein the CBAD flags the connection as anomalous if the extrapolated packet information exceeds at least one of a plurality of historical thresholds.

3. The system of claim 2, wherein at least one of the plurality of historical thresholds is dynamically updated based on stored extrapolated packet information.

4. The system of claim 3, wherein at least one of the plurality of historical thresholds is dynamically updated based on the extrinsic information.

5. The system of claim 2, wherein the CBAD receives extrinsic information pertaining to the observed data packets from a source other than the first node or the second node; and wherein the comparison between the observed packet information and historical data considers the extrinsic information.

6. The system of claim 2, wherein the CBAD sends a notification to one of the plurality of nodes if the connection is flagged as anomalous.

7. The system of claim 1, wherein the CBAD compares the extrapolated packet information against at least one predetermined threshold; and wherein the CBAD flags the connection as anomalous if the extrapolated packet information exceeds at least one of the predetermined thresholds.

8. The system of claim 1, wherein the extrapolated packet information comprises information pertaining to at least one of the parameters selected from the group consisting of: the packet's source node, the packet's destination node, intermediately connected nodes between the source and destination nodes, the sending application, the duration of the connection between the source and destination nodes, the amount of data transferred between the source and destination nodes, the packet's encryption, the time and date that the connection between the source node and the destination node was initialized, the time and date that the connection between the source node and the destination node was terminated, port number of the packet's source node, port number of the packet's destination node, the communication's protocol, the relative amounts of data sent and received by the packet's source node, and the relative amount sent and received by the packet's destination node.

9. The system of claim 1, further comprising:
a third network node of the plurality of network nodes intermediately connected between the first node and second node;
wherein the application sends the data packets from the first node to the second node through the third node; and the CBAD observes the data packets exchanged between the first node and the second node on at least one of the first node, the second node, or the third node.

10. A method for detecting connections within a network comprising:
initializing a connection from an application loaded on a first network node of a plurality of interconnected network nodes, to a second network node of the plurality of interconnected network nodes;
sending, from the application, a plurality of data packets to the second network node;
observing, at a connection-based behavioral anomaly detection device ("CBAD") communicatively connected to at least one node of the plurality of interconnected network nodes, packet information from at least one of the plurality of data packets exchanged between the first node and the second node;
extrapolating, at the CBAD, packet information from at least one of the plurality of data packets exchanged between the first node and the second node; and
storing, on a computer-readable storage device communicatively connected to the CBAD, the extrapolated packet information.

11. The method of claim 10, further comprising:
comparing, at the CBAD, the extrapolated packet information against historical data; and
flagging the network connection as anomalous if at least one of a plurality of historical thresholds is exceeded.

12. The method of claim 11 further comprising:
updating at least one of the plurality of historical thresholds based on the extrapolated packet information.

13. The method of claim 11 further comprising:
receiving, from a source other than the first node and the second node, extrinsic information relating to at least one of the observed data packets exchanged between the first node and second node;
wherein the comparison between the extrapolated packet information against historical data further considers the extrinsic information.

14. The method of claim 13, wherein the at least one of the plurality of historical thresholds is further updated based on the extrinsic information.

15. The method of claim 14 further comprising the step of storing, at a computer-readable storage device operatively connected to the CBAD, the extrapolated packet information;
wherein the historical information comprises previously extrapolated packet information; and the CBAD flags the connection as anomalous if the extrapolated packet information exceeds at least one of a plurality of historical or predetermined thresholds.

16. The system of claim 15, wherein at least one of the plurality of historical thresholds is dynamically updated based on stored extrapolated packet information.

17. The system of claim 15, wherein the CBAD receives extrinsic information pertaining to the observed data packets from a source other than the first node or the second node; and wherein the comparison between the observed packet information and historical data considers the extrinsic information.

18. The system of claim 15, wherein at least one of the plurality of historical thresholds is dynamically updated based on extrinsic information.

19. The system of claim 15, wherein the CBAD sends a notification to one of the plurality of nodes if the connection is flagged as anomalous.

20. The method of claim 10, further comprising:
comparing, at the CBAD, the extrapolated packet information against a predetermined threshold; and
flagging the network connection as a anomalous if the predetermined threshold is exceeded.

21. The method of claim 20 further comprising:
relaying, at a third node of the plurality of network nodes, data packets exchanged between the first node and the second node;
wherein the CBAD observes the data packets on at least one of the first node, the second node, or the third node.

22. A method for detecting connections within a network comprising:
observing, at a connection-based behavioral anomaly detection device ("CBAD"), a plurality of data packets transferred from an application loaded onto a first node of a plurality of interconnected network nodes to a second node of the plurality of interconnected network nodes;
extrapolating packet information from at least one data packet of the plurality of data packets; and
comparing the extrapolated data packets against historical data;
wherein the CBAD is operatively connected to at least one of the nodes of the plurality of interconnected network node; and the application initialized a connection with the second node.

23. The method of claim 22, wherein the extrapolated packet information comprises information pertaining to at least one of the parameters selected from the group consisting of: the packet's source node, the packet's destination node, intermediately connected nodes between the source and destination nodes, the sending application, the duration of the connection between the source and destination nodes, the amount of data transferred between the source and destination nodes, the packet's encryption, the time and date that the connection between the source node and the destination node was initialized, the time and date that the connection between the source node and the destination node was terminated, the port number of the packet's source node, the port number of the packet's destination node, the communication's protocol, the relative amounts of data sent and received by the packet's source node, and the relative amount sent and received by the packet's destination node.

* * * * *